United States Patent
Wakatani et al.

(10) Patent No.: US 8,588,591 B2
(45) Date of Patent: Nov. 19, 2013

(54) REPRODUCING APPARATUS AND REPRODUCING METHOD

(75) Inventors: Shigeki Wakatani, Kanagawa (JP); Tetsuya Makabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/429,885

(22) Filed: Mar. 26, 2012

(65) Prior Publication Data

US 2012/0257880 A1 Oct. 11, 2012

(30) Foreign Application Priority Data

Apr. 7, 2011 (JP) ................................. 2011-085421

(51) Int. Cl.
*H04N 5/93* (2006.01)
(52) U.S. Cl.
USPC ............................................................. 386/353
(58) Field of Classification Search
None
See application file for complete search history.

(56) References Cited

U.S. PATENT DOCUMENTS

2002/0118616 A1* 8/2002 Fujiwara et al. ........... 369/47.29
2003/0185243 A1* 10/2003 Klotsche ....................... 370/498
2005/0111353 A1* 5/2005 Zievers ......................... 370/229
2007/0223505 A1* 9/2007 Itai et al. ....................... 370/412
2011/0116185 A1* 5/2011 Katagiri et al. ............ 360/73.04
2011/0205889 A1* 8/2011 Chen et al. ................... 370/230
2012/0084392 A1* 4/2012 Lipfert et al. ................. 709/217

FOREIGN PATENT DOCUMENTS

JP 09-185462 A 7/1997
WO WO2010102926 * 9/2010

* cited by examiner

*Primary Examiner* — Thai Tran
*Assistant Examiner* — Sunghyoun Park
(74) *Attorney, Agent, or Firm* — Sony Corporation (57) ABSTRACT

A reproducing apparatus includes: a storing unit in which data is accumulated; a readout control unit that controls readout of the data from the storing unit; a cache that temporarily stores the data read out by the readout control unit; and a data transmission and reception control unit that reads out the data stored in the cache and outputs the data to an external apparatus on the basis of a data acquisition request input from the external apparatus, wherein the readout control unit reads out the data from the storing unit and outputs the data to the cache while increasing stepwise a size of the data to be read out from the storing unit from a first size, which is a minimum size set in advance, to a second size, which is a maximum size set in advance.

12 Claims, 8 Drawing Sheets

REPRODUCING APPARATUS AND REPRODUCING METHOD

CROSS-REFERENCE TO RELATED APPLICATION

The present application claims priority from Japanese Patent Application No. JP 2011-085421 filed in the Japanese Patent Office on Apr. 7, 2011, the entire content of which is incorporated herein by reference.

FIELD

The present disclosure relates to a reproducing apparatus that reproduces sound data and video data and a reproducing method for the reproducing apparatus, and, more particularly to a technique for efficiently performing readout of data from a storage.

BACKGROUND

In the past, in a storage in which data is stored, data predicted to be accessed in near future is accumulated in a cache in advance and, when a readout request for the data is received next, the data is read out from the cache. This method is called "read-ahead". The read-ahead increases the probability of readout of the data from the cache having high readout speed. Therefore, an access time to the data is reduced. The effect of the read-ahead is expected when a sequential access to the storage continues, i.e., when data in which offsets continue is read out. In particular, in a reproducing apparatus that performs reproduction of sound data and video data, accesses to a storage are sequentially performed in most cases. Therefore, the effect of the read-ahead tends to be produced.

Figure 7:
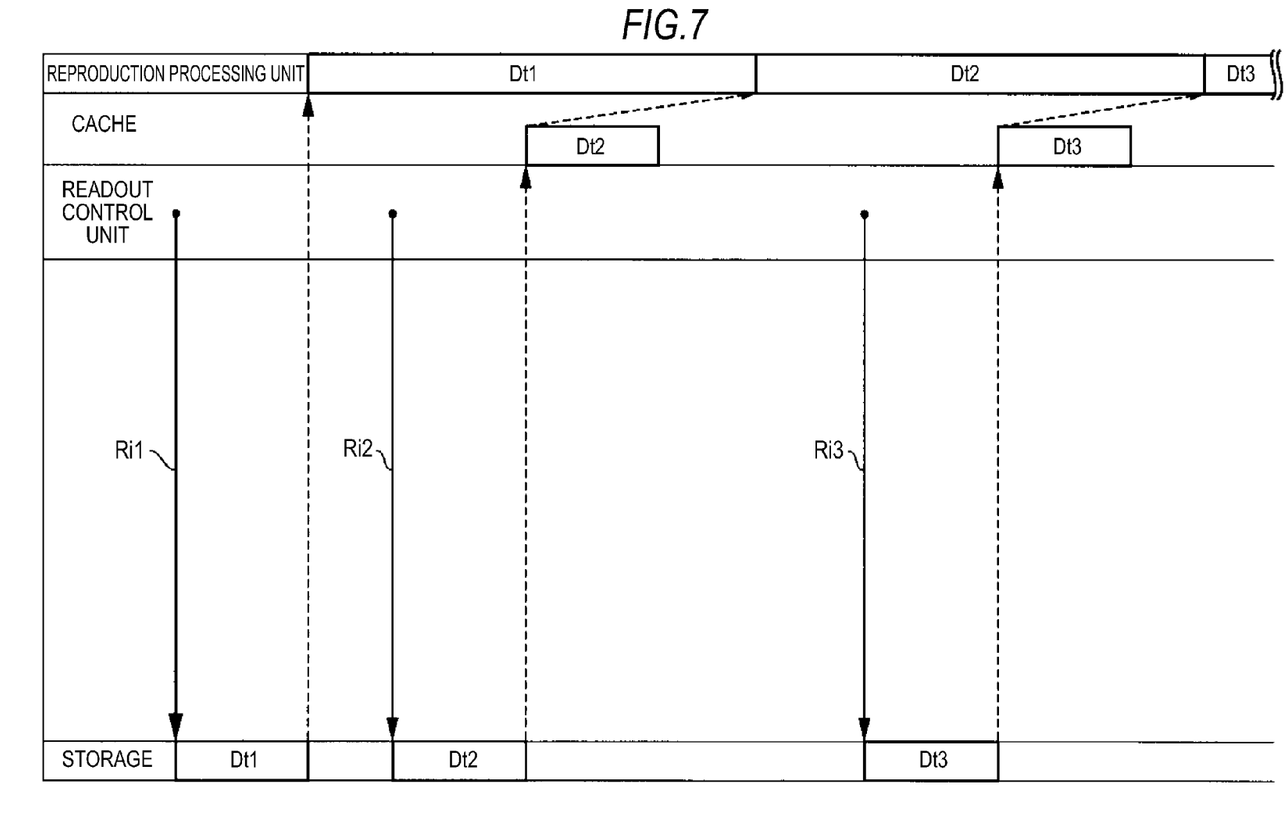
FIG. 7 is an explanatory diagram for explaining an example of read-ahead processing in the past.

An example of read-ahead processing is shown in FIG. 7. In FIG. 7, processing in a storage, a readout control unit, and a reproduction processing unit is shown. Video data and sound data (hereinafter referred to as AV data) are stored in the storage. The data is read out from the storage on the basis of control by the readout control unit. The readout control unit generates a readout request Ri for instructing readout of the data from the storage. The readout control unit transmits data Dt, which is readout from the storage on the basis of the readout request Ri, to a cache or the reproduction processing unit. The reproduction processing unit reproduces and outputs the AV data accumulated in the cache or the AV data directly read out from the storage.

First, when an acquisition request for specific data is input via a not-shown operation panel or the like, the readout control unit generates a readout request Ri1 for the data on the basis of the input acquisition request for the data and outputs the readout request Ri1. In the readout request Ri1, an access start position (an offset) of a file and an amount (length) of the data to be read out are described. At a point when the readout request Ri1 is issued, data is not accumulated in the cache. Therefore, data Dt1 read out from the storage on the basis of the readout request Ri1 is output to the reproduction processing unit. The read-out data Dt1 is reproduced by the reproduction processing unit.

Subsequently, the readout control unit generates a readout request Ri2 for reading out data Dt2 for length set as read-ahead length in advance. The data Dt2 read out on the basis of the readout request Ri2 is not data that actually needs to be read out but is read-ahead data. Therefore, the data is written in the cache.

After the reproduction of the data Dt1 ends, the reproduction processing unit reads out and reproduces the data Dt2 accumulated in the cache rather than reading out the next data from the storage. While the data Dt2 is read out from the cache by the reproduction processing unit, data Dt3 that needs to be reproduced next is read out from the storage and accumulated in the cache. In order for the reproduction processing unit to immediately perform reproduction of the data Dt3 at a point when finishing reproducing the data Dt2, writing of the data Dt3 in the cache needs to be performed before the reproduction processing unit finishes reproducing the data Dt2. In other words, the writing of the data Dt3 in the cache needs to be performed before all the data Dt2 is read out from the cache.

By performing such read-ahead, since the number of times of accesses to the storage is reduced, data readout speed is increased. Further, in a reproducing apparatus that needs to not only perform reproduction of AV data but also perform multitask processing such as editing and transfer of a file to an external apparatus, efficiency of use of a storage can be improved by performing the read-ahead. This is because, by performing the read-ahead, since the frequency of accesses to the storage caused by one task can be reduced, time in which plural tasks can use the storage increases.

Figure 8A:
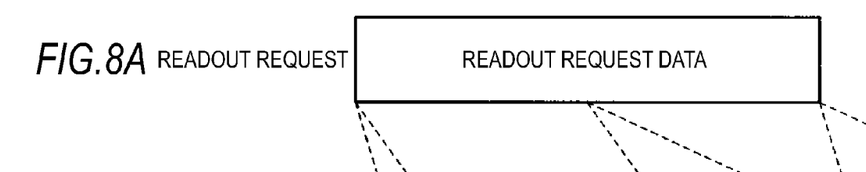
Figure 8B:
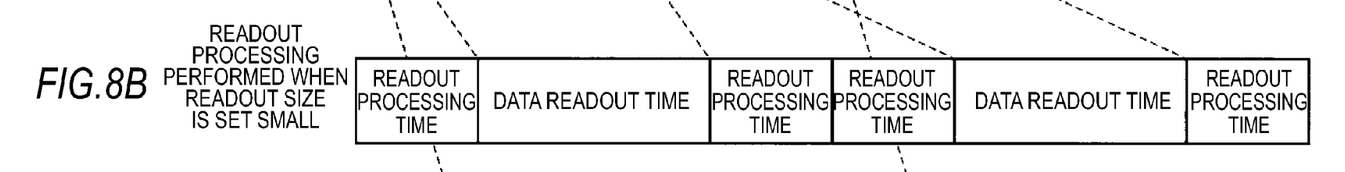
Figure 8C:
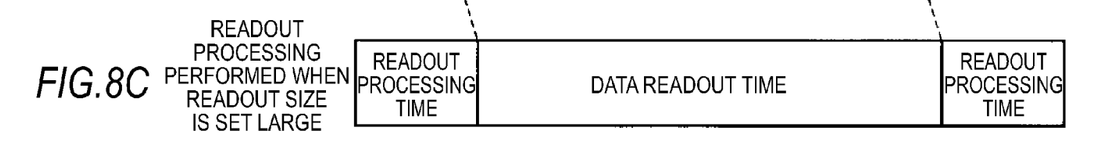

From the viewpoint of improving the efficiency of use of the storage, the size of data read out from the storage at one time is desirably as large as possible. This is because an overhead (readout processing time) consumed during data readout from the storage is fixed regardless of the size of data to be read out. FIGS. 8A to 8C are diagrams showing differences in total processing time between a case of a readout size of data set small and a case of the readout size data set large. FIG. 8A is a diagram of data requested to be read out. The width in the abscissa direction of a frame inscribed as "readout request data" indicates the size of the data. FIG. 8B is a diagram for explaining processing performed when the data requested to be read out is dividedly read out from the storage twice. FIG. 8C is a diagram for explaining processing performed when the data requested to be read out is read out from the storage at one time. In other words, FIG. 8B is a diagram of an example of the readout size of the data to be read out set small. FIG. 8C is a diagram of an example of the readout size set large.

Time consumed for processing performed during readout of the data described as "readout processing time" in FIGS. 8B and 8C is shown as the same length in FIGS. 8B and 8C. It is seen that the time is fixed regardless of the size of data to be actually read out. Therefore, as shown in FIG. 8B, when the size of data read out at one time is set small, a total processing time is extended because of the size of the data. On the other hand, as shown in FIG. 8C, when the size of data read out at one time is set large, a total time consumed for readout of the data can be reduced by the "readout processing time" from that in the processing shown in FIG. 8B. In other words, when the multitask processing is performed, the efficiency of use of the storage can be improved when an amount of data read out at one time from the storage is set large.

However, even if the read-ahead is performed or an amount of data to be read ahead is set large to improve the efficiency of use of the storage, when an access position of a file is designated by a random access, the efficiency of use of the storage is not realized.

Figure 9:
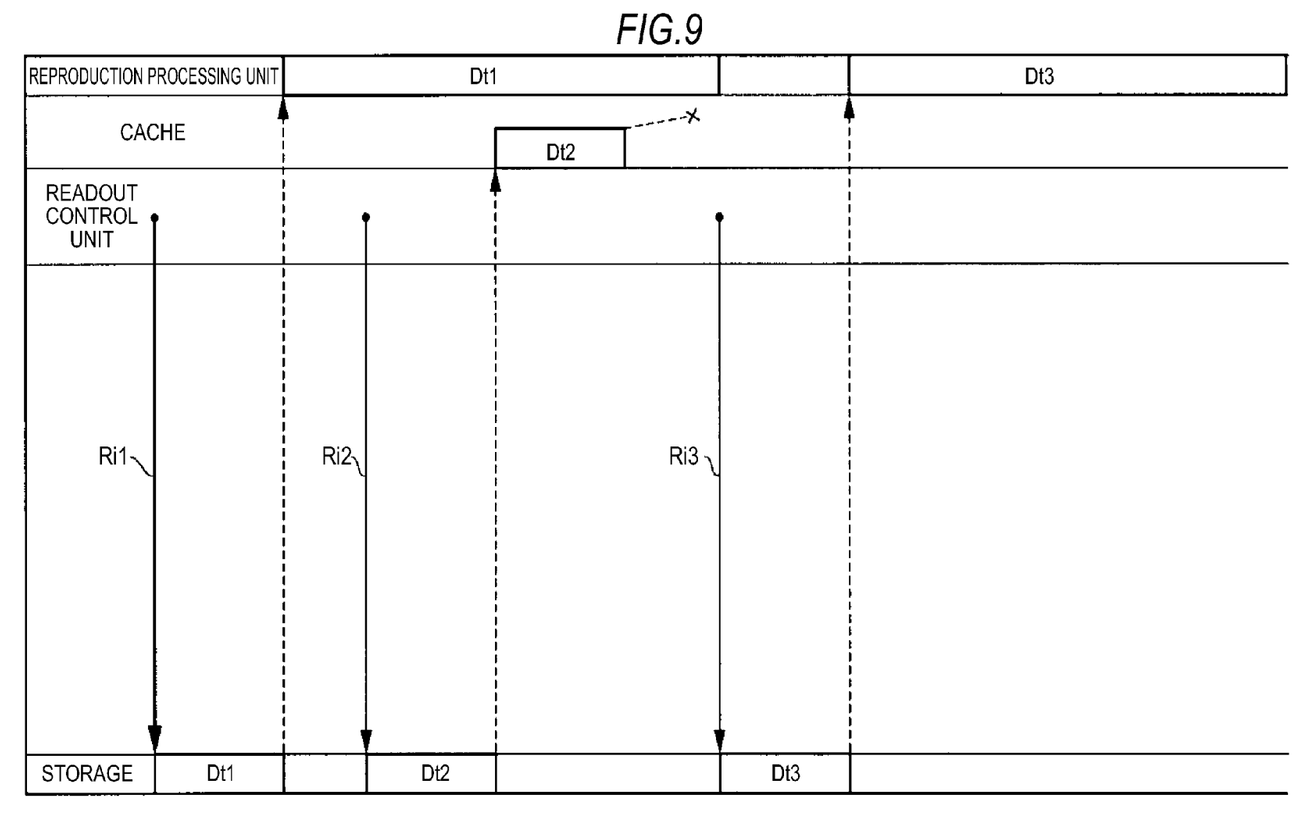
FIG. 9 is an explanatory diagram for explaining an example of processing for reading out data from the storage when a random access is instructed in a state in which a sequential access is performed in the past.

FIG. 9 is a diagram of an example of readout processing performed when a data acquisition request by a random access is generated in a state in which a sequential access to the storage continues. First, the data Dt1 is read out from the storage on the basis of the readout request Ri1 transmitted from the readout control unit. While the read-out data Dt1 is reproduced by the reproduction processing unit, the data Dt2 that should be subsequently reproduced is read out to the cache on the basis of the readout request Ri2.

It is assumed that a data acquisition request by a random access is input. In this case, in a readout request Ri3 generated on the basis of this request, an offset in the readout request Ri3 does not have continuity from an offset of the data Dt2 already read out to the cache. In other words, the data Dt2 written on the cache may be unable to be used as a file to be reproduced by the reproduction processing unit. Therefore, the data Dt3 to be reproduced by the reproduction processing unit is read out anew from the storage rather than from the cache. In such a case, time in which the data Dt3 is read out from the storage directly leads to a delay in a readout response. In other words, when not only a sequential access but also a random access to the storage is performed, it is difficult to simultaneously satisfy the efficient use of the storage and the improvement of a response.

For example, JP-A-09-185462 describes a technique for enabling read-ahead of data and increasing the speed of a file data access or the like even in an access pattern regarded as a random access in the past.

SUMMARY

In a reproducing apparatus that reproduces sound data and video data, it is requested to satisfy both the efficient use of a storage and the improvement of a response.

Therefore, it is desirable to satisfy both the efficient use of a storage and the improvement of a response.

An embodiment of the present disclosure is directed to a reproducing apparatus including a storing unit, a readout control unit, a cache, and a data transmission and reception control unit. The configurations and functions of the units are as explained below. Data is accumulated in the storing unit. The readout control unit controls readout of the data from the storing unit. The cache temporarily stores the data read out by the readout control unit. The data transmission and reception control unit reads out the data stored in the cache and outputs the data to an external apparatus on the basis of a data acquisition request input from the external apparatus. The readout control unit reads out the data from the storing unit and outputs the data to the cache while increasing stepwise the size of the data to be read out from the storing unit from a first size, which is a minimum size set in advance, to a second size, which is a maximum size set in advance.

Another embodiment of the present disclosure is directed to a reproducing method which is performed according to a procedure explained below. First, data is accumulated. Subsequently, the data is read out and output while the size of the data in reading out the accumulated data is increased stepwise from a first size, which is a minimum size set in advance, to a second size, which is a maximum size set in advance. The read-out data is temporarily stored in a cache. The cached data is read out and output to an external apparatus on the basis of a data acquisition request input from the external apparatus.

By adopting such configurations and processing, the size of the data to be read out from the storing unit functioning as a storage to the cache is increased stepwise from the first size to the second size.

With the reproducing apparatus and the reproducing method according to the embodiments of the present disclosure, the size of the data to be read out from the storing unit functioning as the storage to the cache is increased stepwise from the first size to the second size. Therefore, the resolution of a response delay during readout and the improvement of efficiency of use of the storage are simultaneously realized.

BRIEF DESCRIPTION OF THE DRAWINGS

FIGS. 8A to 8C are explanatory diagrams for explaining a difference in a readout time due to a difference in the readout size of data from the storage in the past, wherein FIG. 8A is a diagram of an example of the readout size set small and FIG. 8B is a diagram of an example of the readout size set large.

DETAILED DESCRIPTION

Before explanation of a reproducing apparatus according to an embodiment of the present disclosure, first, processing considered effective for the resolution of a readout response delay and processing considered to be effective for the improvement of efficiency of use of a storage are respectively explained with reference to FIGS. 1 and 2.

Figure 1:
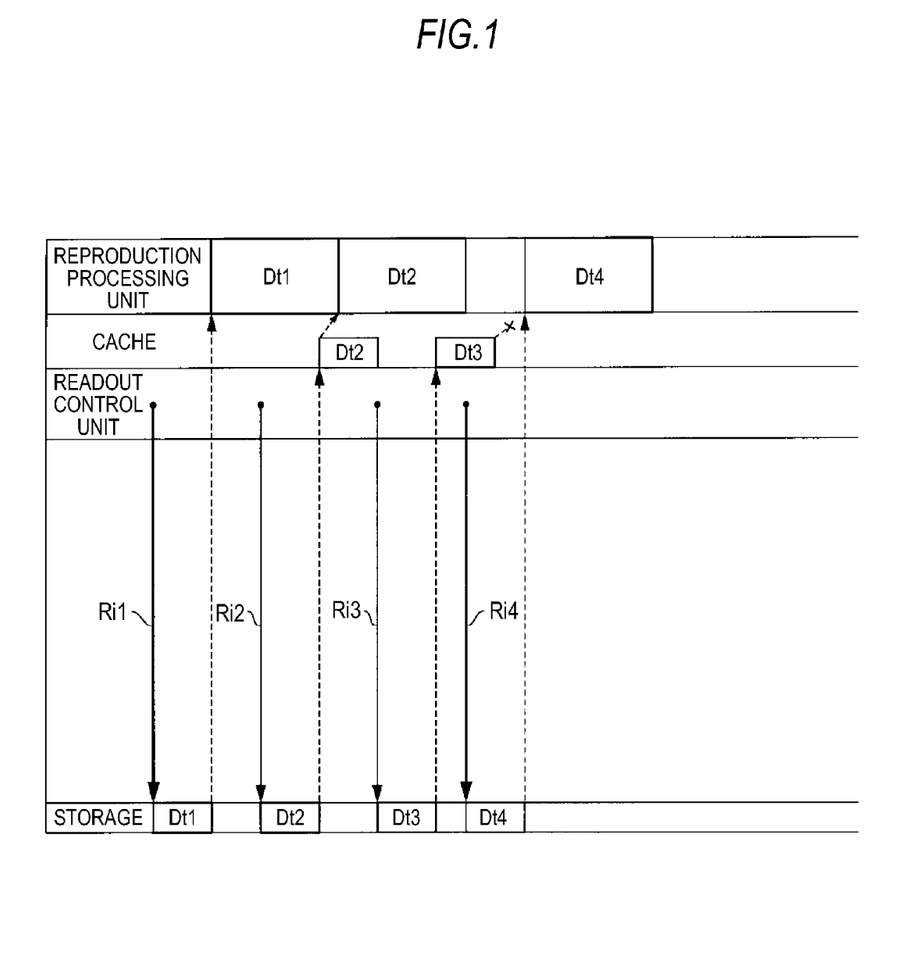
FIG. 1 is an explanatory diagram for explaining an example of readout processing performed when the size of data to be read out from a storage is set small.

FIG. 1 is a diagram of an example of readout processing performed when the size of data to be read out from a storage is set small to resolve a response delay. First, data Dt1 is read out from the storage on the basis of a readout request Ri1 transmitted from a readout control unit. It is assumed that the size of data Dt to be read out from the storage is set to a small size in advance.

Subsequently, while the read-out data Dt1 is reproduced by a reproduction processing unit, data Dt2 that should be reproduced next is read out from the storage on the basis of a readout request Ri2 and written in a cache. While the data Dt2 accumulated in the cache is reproduced by the reproduction processing unit, data Dt3 that should be reproduced next is read out to the cache on the basis of a readout request Ri3.

It is assumed that a readout request Ri4 input from the readout control unit next is a request for instructing an access to a file by a random access. In this case, as in the example shown in FIG. 9, the data Dt3 on the cache may be unable to be used as reproduction data. In such a case, data Dt4 designated by the readout request Ri4 is readout anew from the storage and output to the reproduction processing unit. However, in the example shown in FIG. 1, unlike the example shown in FIG. 9, the size of data read out from the storage at one time is set small. Therefore, since time in which the data Dt4 is read out from the storage is reduced, a delay in a readout response is also reduced.

However, in a method of setting a readout size small in this way, the number of times of reading data from the storage increases. While data is read out from the storage according to one task, other tasks that should be executed as a multitask have to wait for processing (readout of data from the storage) to be carried out. In other words, a command for executing the other tasks can be carried out only in time when the readout of the data by one task is not performed shown in FIG. 1. However, in the example shown in FIG. 1, since an amount of data read out from the storage at one time is set small, time when readout of data from the storage is not performed decreases in proportion to the size of data to be read out. Therefore, since execution itself of the multitask is difficult, efficiency of use of the storage is deteriorated.

Figure 2:
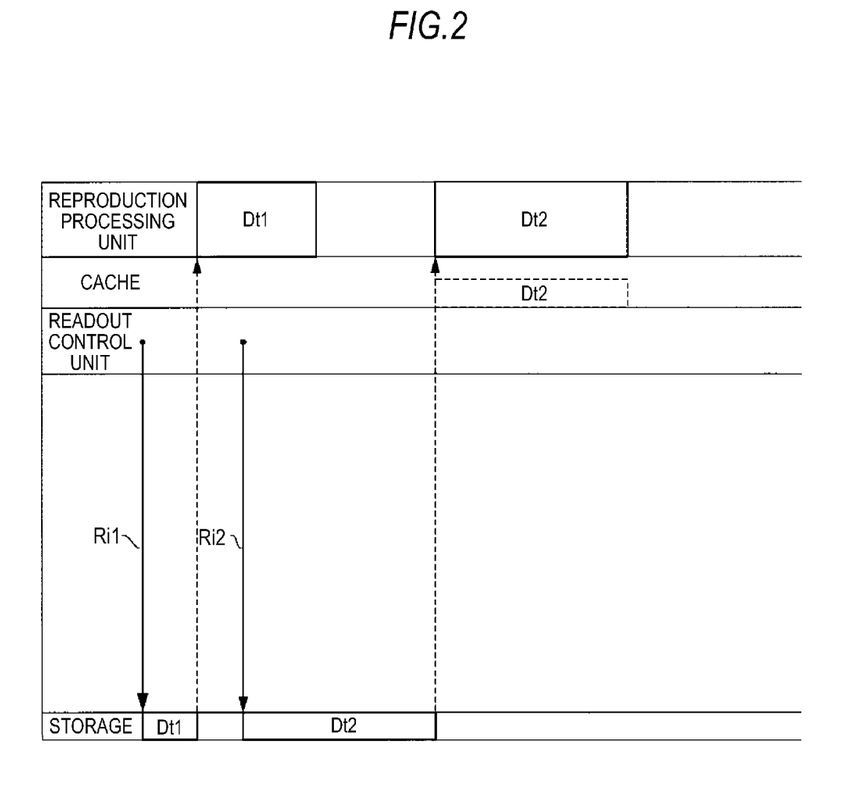
FIG. 2 is an explanatory diagram for explaining an example of readout processing performed when the size of data to be read out first from the storage is set small and the size of data to be read out next is set large.

FIG. 2 is a diagram of an example of processing performed when the readout size of data from the storage is changed in first readout and second readout in order to simultaneously realize the improvement of a response and the improvement of efficiency of use of the storage. When the size of data to be read out from the storage is set large in a state in which data is not accumulated in the cache, time for the readout directly leads to a delay in a response. Therefore, a case in which first readout performed when data is not accumulated in the cache is performed in as small a size as possible and readout of the next data is performed in a large size is considered.

First, first readout of the data Dt1 is performed in a small size on the basis of the readout request Ri1. By performing such processing, it is possible to minimize a delay in a readout response. On the other hand, the readout size of second readout of the data Dt2 is set to a relatively large size. This makes it easy to execute a multitask after this timing. In other words, it is possible to improve efficiency of use of the storage. However, if the size of the data Dt2 to be read out in the second readout is set too large with respect to the size of the data Dt1 read out in the first readout in this way, while the data Dt2 is read out from the storage, reproduction of the data Dt1 by the reproduction processing unit ends. In other words, while the data Dt2 is read out from the storage, all the data Dt1 accumulated in the cache is read out and the cache is emptied. Consequently, the data Dt2 is not read out from the cache but is directly readout from the storage and reproduced. In other words, time in which the data Dt2 is read out from the storage directly leads to a delay time of a response.

To prevent such a problem from occurring, in the reproducing apparatus according to the embodiment of the present disclosure, the size of data to be read out from the storing unit functioning as the storage to the cache is increased stepwise from a first size to a second size.

Examples of a configuration and processing of the reproducing apparatus according to the embodiment of the present disclosure are explained according to order described below. However, the present disclosure is not limited to the examples explained below.

1. Configuration example of the reproducing apparatus
2. Explanation of a method of calculating a readout size
3. Example of processing by a readout control unit
4. Example of readout processing by the reproducing apparatus.

<1. Configuration Example of the Reproducing Apparatus>

Figure 3:
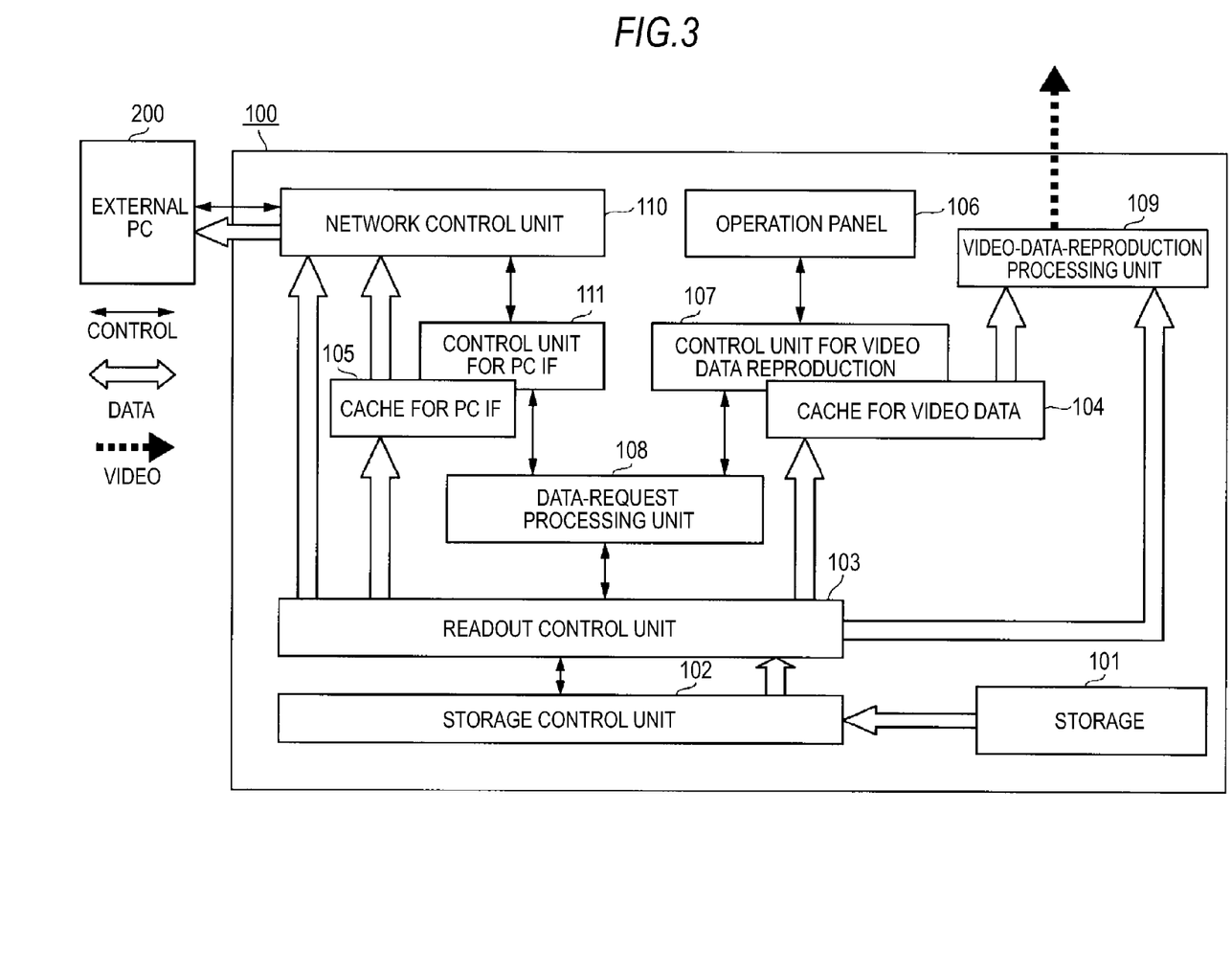
FIG. 3 is a block diagram of a configuration example of a reproducing apparatus according to an embodiment of the present disclosure.

A reproducing apparatus according to the embodiment of the present disclosure is explained with reference to FIG. 3. A reproducing apparatus 100 shown in FIG. 3 includes a storage 101 functioning as a storing unit. Digitized AV data is accumulated in the storage 101. The storage 101 includes an SSD (Solid State Drive), a HDD (Hard Disc Drive), or an optical disk drive. The reproducing apparatus 100 is connected to an external PC (Personal Computer) 200 functioning as an external apparatus via a network. The storage 101 is configured to be used as a network drive for the external PC as well. It is assumed that, for example, an application for nonlinear editing is implemented in the external PC 200 and a data readout request by a random access is input from the external PC 200.

The reproducing apparatus 100 includes a storage control unit 102, a readout control unit 103, a cache for video data 104 functioning as a second cache, and a cache for PC IF (Interface) 105. The storage control unit 102 performs a function of a device driver. The storage control unit 102 operates the actual storage 101 to perform readout of data from the storage 101. The readout control unit 103 performs a function of a file system. The readout control unit 103 generates, according to a data acquisition request, a readout request for instructing readout of a file and transmits the generated readout request to the storage control unit 102. In the readout request, an access start position (an offset) of the file and an amount (length) of data to be read out are described as information necessary for readout of the file.

The readout control unit 103 outputs the file read out from the storage 101 to the cache for video data 104, a video-data-reproduction processing unit 109, the cache for PC IF 105, or a network control unit 110. Since the data accumulated in the storage 101 is AV data, a file readout unit by the readout control unit 103 is a frame data unit. It is assumed that a maximum size (a second size) of a file to be read out is a size equal to the number of frames set as GOP (Group Of Pictures) length. When the GOP is formed by fifteen frames, the second size is fifteen frames.

The reproducing apparatus 100 includes an operation panel 106, a control unit for video data reproduction 107, a data-request processing unit 108, and the video-data-reproduction processing unit 109. The operation panel 106 includes an input unit such as buttons to which operation from a user is input and a display unit such as a display panel that displays a menu and the like. When the operation panel 106 receives an operation input from the user, the operation panel 106 transmits content of the operation input to the control unit for video data reproduction 107 as an operation command. The control unit for video data reproduction 107 interprets the operation command transmitted from the operation panel 106 and replaces the control command with a specific operation. The control unit for video data reproduction 107 generates a request such as a data acquisition request (a second data acquisition request) based on content of the replaced operation and transmits the request to the data-request processing unit 108. The data-request processing unit 108 mediates the request input from the control unit for video data reproduction 107 and a request input from a control unit for PC IF 111 explained later and communicates the requests to the readout control unit 103. The video-data-reproduction processing unit 109 D/A-converts video data stored in the cache for video data 104 or video data directly read out from the storage 101 on the basis of the control by the readout control unit 103 and outputs an obtained video signal.

The reproducing apparatus 100 includes the network control unit 110 functioning as a data transmission and reception control unit and the control unit for PC IF 111. The network control unit 110 controls communication between the reproducing apparatus 100 and the external PC 200. The control unit for PC IF 111 interprets a command transmitted from the external PC 200 via communication and replaces the command with a specific operation. The control unit for PC IF 111 generates a request such as a data acquisition request based on content of the replaced operation and transmits the request to the data-request processing unit 108.

As explained above, the data acquisition request from the control unit for PC IF 111 and the data acquisition request from the control unit for video data reproduction 107 are input to the data-request processing unit 108. The data acquisition request from the control unit for PC IF 111 is transmitted from the external PC 200. As explained above, the data acquisition request by the random access is input from the external PC 200. On the other hand, the data acquisition request transmitted from the control unit for video data reproduction 107 is generated to reproduce video data accumulated in the storage 101. The data acquisition request is a request for instructing readout of data by a sequential access.

While the data acquisition request by the sequential access continues, a file accumulated in the cache (in this case, the cache for video data 104) by read-ahead can be directly used. In such a case, it is advantageous to set the readout size of a file from the storage 101 large in terms of the effective utilization of the storage 101 and the resolution of a response delay.

On the other hand, when acquisition of a file by the random access is requested, a file accumulated in the cache for video data 104 by read-ahead may be unable to be used. In such a case, time in which the file is read out from the storage 101 directly leads to a delay time of a response. Therefore, it is desirable to set the size of the file to be read out from the storage 101 as small as possible.

Therefore, in the reproducing apparatus 100 according to the first embodiment of the present disclosure, first readout of data from the storage 101, for which acquisition of a file by the random access is requested, is performed with a file size set as small as possible. Thereafter, the size of the data to be read out from the storage 101 is gradually increased. The readout size from the storage 101 can be calculated on the basis of the speed of readout of data from the storage 101 by the readout control unit 103 (first speed) and the speed of readout of data from the cache for PC IF 105 by the network control unit (second speed). The second speed is decided according to, for example, a processing time of an application implemented on the external PC 200, the frequency of a data acquisition request performed by the application, the performance of the external PC 200, and the communication speed of a network.

<2. Explanation of a Method of Calculating a Readout Size>

A method of calculating the readout size of data from the storage 101 is explained. First, in calculating the readout size of data, the readout speed of the readout control unit 103 is represented as "x", the size of a file to be read out by the readout control unit 103 is represented as "S", and a readout time of data having the size S by the network control unit 110 is represented as "T". The number of frames in nth readout of data from the storage 101 by the readout control unit 103 is represented as "j" and the number of frames in n−1th readout of the data is represented as "i".

The number of frames j in the nth readout is set to a value that satisfies two expressions below.

$$T(j) < S(i)/x \quad (1)$$

$$j > i \quad (2)$$

Specifically, according to Expression 1, the number of frames j in the nth readout is set to a value at which a readout time T(j) for j frames by the readout control unit 103 is smaller than a value obtained by dividing data S(i) for i frames by a readout time x by the network control unit 110. Consequently, in a period until the readout control unit 103 reads out all data stored in the cache for PC IF 105, data size that can be read out from the storage 101 by the readout control unit 103 is calculated. Further, the number of frames j calculated by Expression 1 needs to be larger than the number of frames i already read out (Expression 2).

An example of calculation of a readout size using specific numerical values is explained below. It is assumed that a minimum value of values that can be taken by the numbers of frames i and j is 1 and a maximum value of the values is 15 (=GOP length), which is the second size. It is assumed that speed x of readout of data from the cache for PC IF 105 by the network control unit 110 is 24 MB/s. The speed of readout of a file from the storage 101 by the readout control unit 103 is different depending on the size of the file and is calculated in advance according to the number of frames forming the file. File sizes S and readout speeds T of the readout control unit 103 in the cases of the numbers of frames 1, 2, 3, 4, 5, 10, and 15 are described below.

Number of frames is 1: S(1)=275 kB, T(1)=10 ms
Number of frames is 2: S(2)=550 kB, T(2)=12 ms
Number of frames is 3: S(3)=825 kB, T(3)=16 ms
Number of frames is 4: S(4)=1100 kB, T(4)=19 ms
Number of frames is 5: S(5)=1375 kB, T(5)=23 ms
Number of frames is 10: S(10)=2750 kB, T(10)=28 ms
Number of frames is 15: S(15)=4000 kB, T(15)=34 ms First, a minimum size (a first size) of data to be read out first from the storage 101 is calculated. When the data is readout first, since the concept of "n−1" is absent, first, on the assumption that i frames are accumulated in the cache for PC IF 105, time consumed until all data of the i frames is read out is calculated (the right side of Expression 1). The numbers of frames that can be substituted in "j" of T(j) on the right side of Expression 1 are examined. The numbers of frames satisfying Expression 2 are narrowed down according to the number of frames that can be substituted in "j".

When, for example, "1" is substituted in "i" on the right side of Expression 1, S(1)/x=275 [kB]/24 [MB/s]=11.4 ms is obtained.

To satisfy Expression 1, a value of T(j) needs to be smaller than 11.4 ms. T(j)<11.4 ms is satisfied only in the case of j=1 (T=10 ms). However, in this case, since i=j=1, "j>i" of Expression 2 is not satisfied.

When "2" is substituted in "i" on the right side of Expression 1, the right side is S(2)/x=550 [kB]/24 [MB/s]=22 ms.

Since Expression 1 is represented as T(j)=22 ms, values that can be taken as the number of frames j are "1", at which T=10 ms, to "4", at which T=19 ms. Among these values, values satisfying Expression 2 are j=3 and j=4. Therefore, the size of the first readout only has to be 2 frames and the size of the second readout only has to be 3 frames or 4 frames. In such a case, actually, it is considered that the size of 3 frames is often selected with a margin taken into account.

The size of the third readout can be calculated by substituting "3" in "i" and performing the same calculation. When "3" is substituted in "i" on the right side of Expression 1, the right side is S(3)/x=825 [kB]/24 [MB/s]=34 ms.

Since Expression 1 is represented as T(j)<34 ms, values that can be taken as the number of frames j are "1", at which T=10 ms, to "10", at which T=28 ms. Among these values, values satisfying Expression 2 are j=4 to 10. As the number of frames j, "10", which is a maximum number of frames, is set, i.e., the number of frames j=10.

When i=10, the right side of Expression 1 is S(10)/x=2750 [kB]/24 [MB/s]=114 ms.

Since Expression 1 is represented as T(j)<114 ms, values that can be taken as the number of frames j are all the numbers of frame "1", at which T=10 ms, to "15", at which T=34 ms. Among these values, values satisfying Expression 2 are j=11 to 15. As the number of frames j, a maximum value "15" is adopted. After the number of frames j is set to "15", i.e., when the number of frames j reaches the second size, the following readout is performed in a unit of 15 frames.

Figure 4:
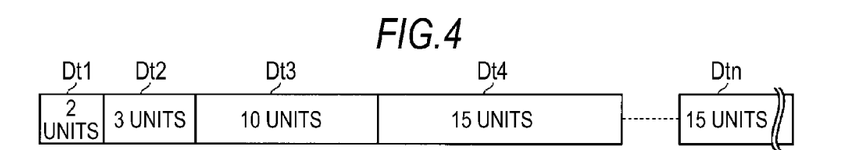
FIG. 4 is an explanatory diagram for explaining an example of setting of the readout size of data from a storage according to the embodiment of the present disclosure.

An image of readout of data from the storage 101 based on the readout sizes calculated in this way is shown in FIG. 4. "Unit" shown in FIG. 4 means "edit unit". The "edit unit" is a unit of one frame in digitized video data.

As shown in FIG. 4, the data Dt1 for two edit units is read during a first access. The data Dt2 for three edit units is read during a second access. The reading for the data Dt2 for the three edit units is performed in a period until all the data Dt1 for the two edit units already read into the cache for PC IF 105 (see FIG. 3) is read out by the readout control unit 103. The data Dt3 for ten edit units is read during a third access. The reading of the data Dt3 for the ten edit units is performed in a period until all the data Dt2 for the three edit units already read into the cache for PC IF 105 is read out by the readout control unit 103.

The data Dt4 for fifteen edit units is read during a fourth access. The reading of the data Dt4 for the fifteen edit units is performed in a period until all the data Dt3 for the ten edit units already read into the cache for PC IF 105 is read out by the readout control unit 103. The following readout of data from the storage 101 is performed in a unit of fifteen edit units as long as a sequential data readout request continues. In other words, while an access start position (an offset) of a file instructed in a readout request supplied from the data-request processing unit 108 (see FIG. 3) is continuous from an offset of a file read out last time, the read out in the unit of fifteen edit units is continued. If the offset indicated by the readout request is discontinuous from the offset of the file read out last time, the readout size from the storage 101 is reset to the two edit units and is gradually increased. Such calculation of a readout size of a file from the storage 101 may be performed in advance before the reproduction processing is performed. However, the calculation may be performed every time readout of a file is generated.

<3. Example of Processing by the Readout Control Unit>

An example of processing by the readout control unit 103 is explained with reference to a flowchart of FIG. 5. First, the readout control unit 103 determines whether a data acquisition request from the data-request processing unit 108 is received (step S1). While the data acquisition request is not received, the readout control unit 103 repeats the determination in step S1. When the data acquisition request from the data-request processing unit 108 is received, the readout control unit 103 determines whether an offset of a file indicated by the data acquisition request is continuous from an offset of a file read out last time (step S2). When the readout control unit 103 determines that the offset of the file indicated by the data acquisition request is discontinuous from the offset of the file read out last time, the readout control unit 103 sets a readout size of data from the storage 101 to the minimum size (the first size) (step S3), generates a readout request for requesting readout of data in the set size, and supplies the readout request to the storage control unit 102 (step S4).

Subsequently, the readout control unit 103 determines whether a residual amount of data on the cache for PC IF 105 is equal to or smaller than a predetermined threshold set in advance (step S5). While the residual amount of the data on the cache for PC IF 105 is larger than the predetermined threshold, the readout control unit 103 repeats the determination in step S5. When the residual amount of the data on the cache for PC IF 105 is equal to or smaller than the predetermined threshold, the readout control unit 103 returns to S1 and continues the determination.

When the readout control unit 103 determines in step S2 that the offset of the file indicated by the data acquisition request is continuous from the offset of the file read out last time, subsequently, the readout control unit 103 determines whether a readout size set last time is the maximum size (the second size) (step S6). When the readout size set last time is not the maximum size, i.e., the readout size set last time is a size smaller than the maximum size, the readout control unit 103 sets a size larger than the readout size set last time by one stage as a readout size and proceeds to step S4. When the readout size set last time is the maximum size, the readout control unit 103 sets the readout size to the maximum size and proceeds to step S4.

Figure 5:
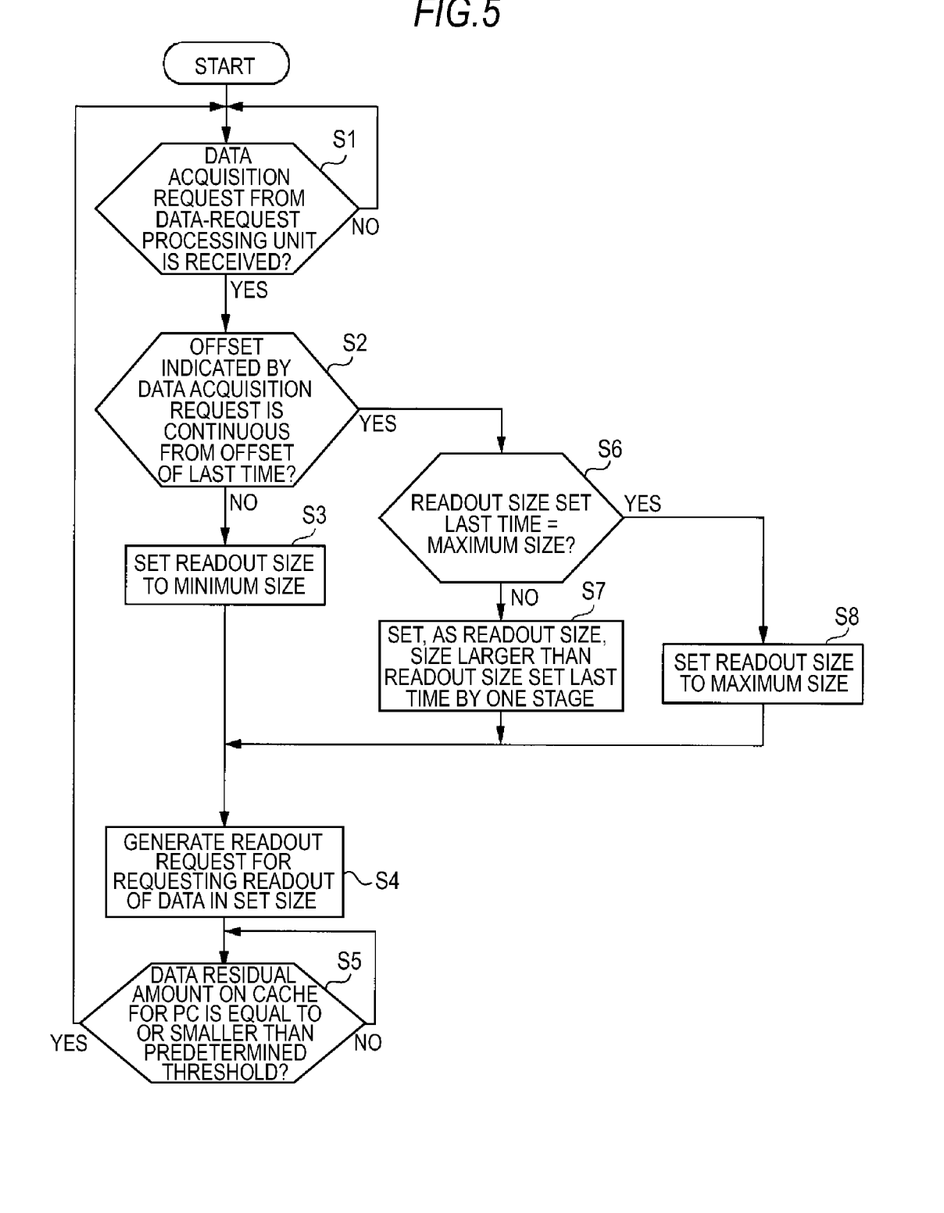
FIG. 5 is a flowchart for explaining an example of processing by a readout control unit according to the embodiment of the present disclosure.
Figure 6:
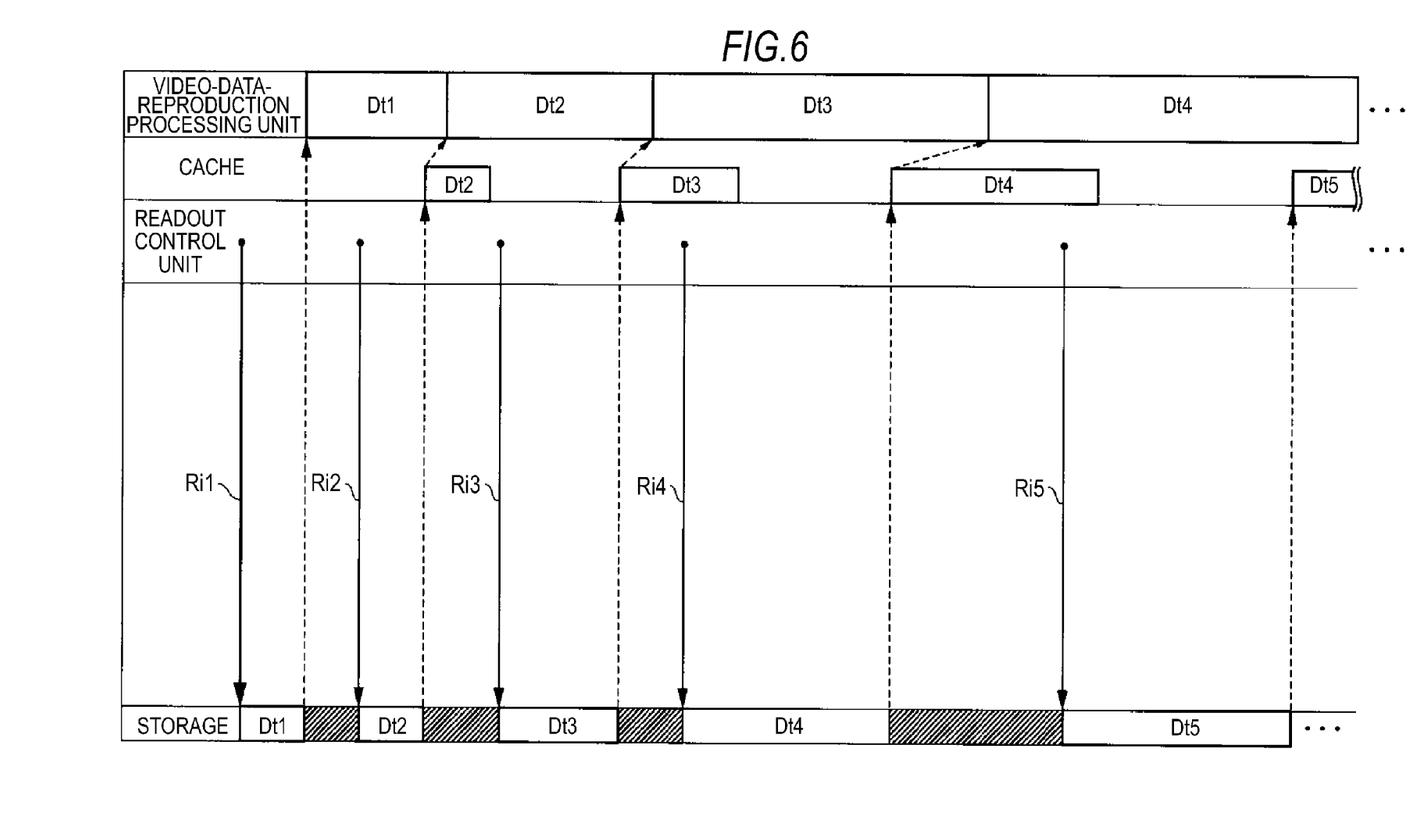
FIG. 6 is an explanatory diagram for explaining an example of processing for reading out data from the storage according to the embodiment of the present disclosure.

FIG. 6 is a diagram of an example of data readout processing in the reproducing apparatus 100 performed when the readout control unit 103 performs the processing shown in FIG. 5. It is assumed that the readout request Ri1 issued from the readout control unit 103 first shown in FIG. 6 is generated on the basis of a data acquisition request in which an offset discontinuous from an offset of a file accessed last time is designated.

Therefore, the readout control unit 103 reads out the data Dt1 from the storage 101 in the minimum size set in advance and outputs the data Dt1 to the video-data-reproduction processing unit 109. When applied to the example shown in FIG. 4, the size of the data Dt1 is the two edit units. The data Dt1 read out from the storage 101 is reproduced by the video-data-reproduction processing unit 109.

In this way, when the offset discontinuous from the offset of the file accessed last time is designated in the data acquisition request, data accumulated in the cache for PC IF 105 may be unable to be used. In such a case, time in which the data Dt1 is read out from the storage 101 directly leads to a delay time of a response. With the reproducing apparatus 100 according to the embodiment of the present disclosure, in such a case, the size of the data Dt1 to be read out is set to the minimum size. This makes it possible to minimize a response delay.

It is assumed that, in each of data acquisition requests subsequently transmitted from the data-request processing unit 108 (see FIG. 1), an offset of a file indicated by the data acquisition request is continuous from an offset of a file read out last time. Therefore, the readout control unit 103 sets the readout size of data from the storage 101 to a size (the three edit units) one stage larger than the size read out last time (the two edit units) by one stage and transmits the readout request Ri2. The data Dt2 for three units is read out from the storage 101 on the basis of the readout request Ri2 and written in the cache for PC IF 105. The data Dt2 written in the cache for PC IF 105 is read out by the video-data-reproduction processing unit 109 before reproduction of the data Dt1 by the video-data-reproduction processing unit 109 ends and is reproduced simultaneously with the end of the reproduction of the data Dt1.

Subsequently, the readout control unit 103 sets the readout size of data from the storage 101 to a size still larger by one stage, i.e., ten units (see FIG. 4) and transmits the readout request Ri3. The data Dt3 for ten units is read out from the storage 101 on the basis of the readout request Ri3 and written in the cache for PC IF 105. The readout of the data Dt3 from the storage 101 is performed by the video-data-reproduction processing unit 109 in a period until all data of the data Dt2 is reproduced by the video-data-reproduction processing unit 109. In other words, the readout is performed in a period until the cache for PC IF 105 is exhausted.

Subsequently, the readout control unit 103 sets the readout size of data from the storage 101 to a size still larger by one stage, i.e., fifteen units (see FIG. 4) and transmits the readout request Ri4. On the basis of the readout request Ri4, the data Dt4 for fifteen units is read out from the storage 101 and written in the cache for PC IF 105. The readout of the data Dt4 from the storage 101 performed in a period until all the data Dt3 is reproduced by the video-data-reproduction processing unit 109. In other words, the readout of the data Dt4 is performed in a period until the cache for PC IF 105 is exhausted. The size of data read out from the storage 101 thereafter is set to the maximum size, i.e., the fifteen edit units as long as a sequential access to the storage 101 continues.

As the size of data read out from the storage 101 increases, time in which an access to the storage 101 is not performed also increases as indicated by shading in FIG. 6 in proportion to the increase in the size. In other words, chances for other tasks started in a multitask to access the storage 101 also increase. Therefore, the storage 101 can be efficiently used.

In short, with the reproducing apparatus 100 according to the embodiment of the present disclosure, when accesses by both the random access and the sequential access are assumed, it is possible to obtain two effects: the resolution of a response delay and the effective use of the storage 101.

In the example explained in the embodiment, the reproducing apparatus according to the embodiment of the present disclosure is applied to the reproducing apparatus that performs only reproduction. However, the reproducing apparatus may be applied to a recording and reproducing apparatus that can also perform recording.

In the example explained in the embodiment, the second size set by the readout control unit 103 is set as the GOP length. However, the second size is not limited to this. As the second size, an optimum value corresponding to a format of data read out from the storage 101 is set.

The present disclosure can also adopt configurations explained below.

(1) A reproducing apparatus including:
a storing unit in which data is accumulated; a readout control unit that controls readout of the data from the storing unit;
a cache that temporarily stores the data read out by the readout control unit; and
a data transmission and reception control unit that reads out the data stored in the cache and outputs the data to an external apparatus on the basis of a data acquisition request input from the external apparatus, wherein
the readout control unit reads out the data from the storing unit and outputs the data to the cache while increasing stepwise the size of the data to be read out from the storing unit from a first size, which is a minimum size set in advance, to a second size, which is a maximum size set in advance.

(2) The reproducing apparatus described in (1), wherein the first size and readout sizes larger than the first size and smaller than the second size are calculated on the basis of first speed, which is speed for the readout control unit to read out the data from the storing unit, and second speed, which is speed for the data transmission and reception control unit to read out the data from the cache.

(3) The reproducing apparatus described in (1) or (2), wherein the second speed is lower than the first speed, and the first size and readout sizes larger than the first size and smaller than the second size are calculated as a maximum size that the readout control unit can read out from the storing unit in a period until the readout control unit reads out all the data stored in the cache.

(4) The reproducing apparatus described in any one of (1) to (3), wherein the data is sound data and video data, and a unit of the readout of the data by the readout control unit and the data transmission and reception control unit is a frame.

(5) The reproducing apparatus described in any one of (1) to (4), wherein, when the readout speed of the readout control unit is represented as x, a size of the data read out by the readout control unit is represented as S, and time in which the data transmission and reception control unit reads out the data having the size S is represented as T, the number of frames j in nth readout of the data from the storing unit by the readout control unit is set to a value at which readout time T(j) of the j frames by the readout control unit is smaller than S(i)/x, which is a value obtained by dividing a data size S(i) of i frames by time of readout by the data transmission and reception control unit, and a value larger than the number of frames i of data read out in n−1th readout from the storing unit by the readout control unit.

(6) The reproducing apparatus described in any one of (1) to (5), further including: a second cache that temporarily stores the data read out by the readout control unit; and a reproduction processing unit that reads out the data stored in the second cache and reproduces the data on the basis of a second readout request input through the operation unit, wherein
when an access start position of data indicated by the readout request or the second readout request is discontinuous from a position accessed last time, the readout control unit reads out the data from the storing unit in the first size.

(7) The reproducing apparatus described in (6), wherein a maximum value that the j can take is equal to the second size, and the second size is equal to a size of a minimum unit structure specified by an encoding standard for the sound data and the video data.

(8) A reproducing method includes:
accumulating data;
reading out and outputting the data while increasing stepwise a size of the data in reading out the accumulated data from a first size, which is a minimum size set in advance, to a second size, which is a maximum size set in advance;
temporarily caching the read-out data; and
reading out the cached data and outputting the cached data to an external apparatus on the basis of a data acquisition request input from the external apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising:
a storing unit in which data is accumulated;
a readout control unit that controls readout of the data from the storing unit;
a cache that temporarily stores the data read out by the readout control unit; and
a data transmission and reception control unit that reads out the data stored in the cache and outputs the data to an external apparatus on the basis of a data acquisition request input from the external apparatus, wherein
the readout control unit reads out the data from the storing unit and outputs the data to the cache while increasing stepwise a size of the data to be read out from the storing unit from a first size, which is a minimum size set in advance, to a second size, which is a maximum size set in advance, wherein the first size and readout sizes larger than the first size and smaller than the second size are calculated on the basis of a first speed, which is speed for the readout control unit to read out the data from the storing unit, and a second speed, which is speed for the data transmission and reception control unit to read out the data from the cache.

2. The reproducing apparatus according to claim 1, wherein
the second speed is lower than the first speed, and
the first size and readout sizes larger than the first size and smaller than the second size are calculated as a maximum size that the readout control unit read out from the storing unit in a period until the readout control unit reads out all the data stored in the cache.

3. The reproducing apparatus according to claim 1, wherein
the data is sound data and video data, and
a unit of the readout of the data by the readout control unit and the data transmission and reception control unit is a frame.

4. The reproducing apparatus according to claim 1, wherein,
when the readout speed of the readout control unit is represented as x, a size of the data read out by the readout control unit is represented as S, and time in which the data transmission and reception control unit reads out the data having the size S is represented as T, a number of frames j in nth readout of the data from the storing unit by the readout control unit is set to a value at which readout time T(j) of the j frames by the readout control unit is smaller than S(i)/x, which is a value obtained by dividing a data size S(i) of i frames by time of readout by the data transmission and reception control unit, and a value larger than the number of frames i of data read out in n−1 th readout from the storing unit by the readout control unit.

5. The reproducing apparatus according to claim 4, further comprising:
a second cache that temporarily stores the data read out by the readout control unit; and
a reproduction processing unit that reads out the data stored in the second cache and reproduces the data on the basis of a second data acquisition request input through the operation unit, wherein
when an access start position of data indicated by the acquisition request or the second data acquisition request is discontinuous from a position accessed last time, the readout control unit reads out the data from the storing unit in the first size.

6. The reproducing apparatus according to claim 5, wherein
a maximum value that the j can take is equal to the second size, and
the second size is equal to a size of a minimum unit structure specified by an encoding standard for the sound data and the video data.

7. A reproducing method comprising:
accumulating data;
reading out and outputting the accumulated data while increasing stepwise a size of the data in reading out the accumulated data from a first size, which is a minimum size set in advance, to a second size, which is a maximum size set in advance;
temporarily caching the read-out accumulated data; and
reading out the cached data and outputting the cached data to an external apparatus on the basis of a data acquisition request input from the external apparatus, wherein the first size and readout sizes larger than the first size and smaller than the second size are calculated on the basis of a first speed, which is speed for reading out the accumulated data, and a second speed, which is speed for reading out the cached data.

8. The reproducing method according to claim 7, wherein
the second speed is lower than the first speed, and
the first size and readout sizes larger than the first size and smaller than the second size are calculated as a maximum size that is read out in a period until the all the cached data is read out.

9. The reproducing method according to claim 7, wherein
the data is sound data and video data, and
a unit of the readout of the accumulated data and the cached data is a frame.

10. The reproducing method according to claim 7, wherein,
when the readout speed of the accumulated data is represented as x, a size of the accumulated data read out is represented as S, and time in which the cached data having the size S is read out is represented as T, a number of frames j in nth readout of the accumulated data is set to a value at which readout time T(j) of the j frames is smaller than S(i)/x, which is a value obtained by dividing a data size S(i) of i frames by time of readout of the cached data, and a value larger than the number of frames i of accumulated data read out in n−1th.

11. The reproducing method according to claim 10, wherein
a maximum value that the j can take is equal to the second size, and
the second size is equal to a size of a minimum unit structure specified by an encoding standard for the sound data and the video data.

12. The reproducing method according to claim 7, further comprising:
storing temporarily the accumulated read-out data read in a second cache;
reading out the data stored in the second cache; and
reproducing the data stored in the second cache on the basis of a second data acquisition request input, wherein
when an access start position of data indicated by the acquisition request or the second data acquisition request is discontinuous from a position accessed last time, the accumulated data is read out in the first size.

* * * * *